United States Patent
Schroeder et al.

(10) Patent No.: US 7,426,523 B2
(45) Date of Patent: Sep. 16, 2008

(54) META OBJECT FACILITY COMPLIANT INTERFACE ENABLING

(75) Inventors: Guido Schroeder, Menlo Park, CA (US); Christian Muenkel, Schriesheim (DE); Christopher Forkin, Berowra Heights (AU); Jens Hertweck, Mountain View, CA (US)

(73) Assignee: SAP AG, Walldorf (DE)

( * ) Notice: Subject to any disclaimer, the term of this patent is extended or adjusted under 35 U.S.C. 154(b) by 429 days.

(21) Appl. No.: 10/799,364

(22) Filed: Mar. 12, 2004

(65) Prior Publication Data

US 2005/0203951 A1   Sep. 15, 2005

(51) Int. Cl.
*G06F 7/00* (2006.01)
*G06F 3/00* (2006.01)

(52) U.S. Cl. .................... 707/103 Z; 719/316

(58) Field of Classification Search ............... 707/103, 707/4, 5, 103 Y, 103 X, 103 Z, 100–102; 719/310, 316, 320; 709/246
See application file for complete search history.

(56) References Cited

U.S. PATENT DOCUMENTS

| 6,918,122 B2* | 7/2005 | Matula et al. ............... 719/316 |
| 6,988,273 B2* | 1/2006 | Matula et al. ............... 719/316 |
| 6,999,956 B2* | 2/2006 | Mullins ........................ 707/2 |
| 2002/0091702 A1* | 7/2002 | Mullins ...................... 707/100 |
| 2003/0208505 A1* | 11/2003 | Mullins et al. ............... 707/102 |
| 2003/0233365 A1* | 12/2003 | Schmit et al. ............... 707/100 |
| 2004/0221292 A1* | 11/2004 | Chiang et al. ............... 719/310 |

OTHER PUBLICATIONS

John Poole, Jan. 29, 2003, Hyperison Solutions Corporation, Model-driven Data Warehousing.*
Poole, John D., "Java Metadata Interface and Data Warehousing," Online! Nov. 2002, (XP002332762).
Dirckze, et al., "Java metadata Interface (JMI) specification," Online! Jun. 7, 2002, pp. 1-136, (XP002332761).
Eckerson et al., "Paving the Way for Transparent Application and Data interchange," Online! Nov. 1999 (XP002332763).
Sharma et al., "J2EE Connector Architecture and Enterprise Application Integration," Dec. 2001, Sun Microsystems, Inc. (XP002332888).
Flanagan, David, "Java in a Nutshell, Third Edition" 2001, O'Reilly & Associates, Inc., pp. 1-3 (XP002332947).

* cited by examiner

*Primary Examiner*—Hung Tran Vy
(74) *Attorney, Agent, or Firm*—Mintz, Levin, Cohn, Ferris, Glovsky & Popeo, P.C.

(57) ABSTRACT

Systems and methods for enabling a Meta Object Facility (MOF) compliant service for a metadata resource. The systems and methods employ a connector adapted to receive metadata from the metadata resource via a resource-specific application programming interface, and a metamodel repository storing one or more MOF models. The systems and methods further employ a persistence interface between the connector and metamodel repository. The persistence interface is configured to instantiate at least one MOF compliant service for the connector based on one of the MOF models in the metamodel repository.

6 Claims, 5 Drawing Sheets

META OBJECT FACILITY COMPLIANT INTERFACE ENABLING

BACKGROUND

This document relates to the sharing of metadata. More particularly, this document describes systems and methods for metadata integration in a heterogeneous software system landscape.

Metadata, the exchange of metadata and its programmatic access through APIs plays a central role in almost any software product. Metadata defines the structure and meaning of data objects and is used by applications to define, relate and manipulate objects. In order to make software products more interoperable, a general trend in industry is to base the access, exchange, and structure of metadata on common standards, i.e. common access application programming interfaces (APIs), common interchange formats and common metamodels.

The Java Metadata Interface (JMI) provides a common access API for metadata on a Java platform. JMI is based on the OMG's Meta Object Facility (MOF) and defines patterns that translate any MOF-based metamodel into a corresponding set of Java interfaces and thus a common programming model for accessing metadata. JMI defines a JMI Service as any system that provides a JMI-compliant API to its public metadata. The Java rendering of a Java API can be easily automated using the JMI patterns as it is completely generic and applicable to any metamodel that adheres to the MOF standard. However the JMI specification itself does not provide any patterns for implementing a JMI-compliant service.

Only a small percentage of available metadata is typically used by an application, however. As one consequence, not all associations of metadata to other metadata are needed at once. Prior solutions have employed techniques that first instantiate a complete set of JMI metadata objects from the underlying metadata resource, and then exchange this metadata using an XML metadata interchange (XMI)-formatted XML file. However, these techniques required that a large amount of metadata be extracted all at once for transport and manipulation.

SUMMARY

This document discloses systems and methods for implementing a MOF-compliant service, such as a JMI service, on any metadata resource such as a relational database management system (RDBMS) or a data warehouse. In particular, these systems and methods support a dynamic exploration of a metadata resource, i.e. on-demand instantiation of JMI objects on an API, and completely generate implementing classes for the API independent of the specific protocol that is used to access the metadata store. This is particularly beneficial with large resources, e.g. a RDBMS that contains vast amount of metadata.

In one aspect, a system for enabling a MOF-compliant service for a metadata resource includes a connector adapted to receive metadata from the metadata resource via a resource-specific API, and a metamodel repository storing one or more MOF models. One exemplary system further includes a persistence interface between the connector and metamodel repository. The persistence interface is configured to instantiate at least one MOF compliant service for the connector based on one of the MOF models in the metamodel repository.

In another aspect, a method of enabling a MOF-compliant service for a metadata resource communicating via a resource-specific API includes the step of providing a connector to the resource-specific API. The connector is adapted to receive metadata from the metadata resource. An exemplary method further includes the steps of registering the connector and resource-specific API with a repository server, and mapping the resource-specific API with one or more MOF models stored in the repository server. Another exemplary method includes the step of instantiating the MOF compliant service according to one of the MOF models mapped to the resource-specific API.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a design pattern for MOF-compliant metadata service, such as a JMI service. Metamodels such as the CWM are loaded into a MOF-compliant Meta-Model Repository (MMR). The MMR provides a service that translates the model into a Java API according to JMI code templates. The MMR furthermore generates a complete implementation of this Java API. The generated implementation of the model/API contains only model-specific parts. Resource-specific parts are completely separated from the model-specific parts and encapsulated into a persistence component. The persistence component implements a callback interface that is called by the MMR during runtime. The implementation of a JMI service is thus reduced to the implementation of this persistence component.

Calls on methods of the generated JMI implementation are forwarded to an instance of the MMR. If those instances are not already contained in the associated MMR instance, the MMR has a callback interface with the persistence component for getting these missing object or association instances. This design pattern supports a dynamic and "on demand" exploration of a metadata resource through a JMI service, without the need to instantiate at once the entire contents of the MMR when connecting to the resource.

Figure 1:
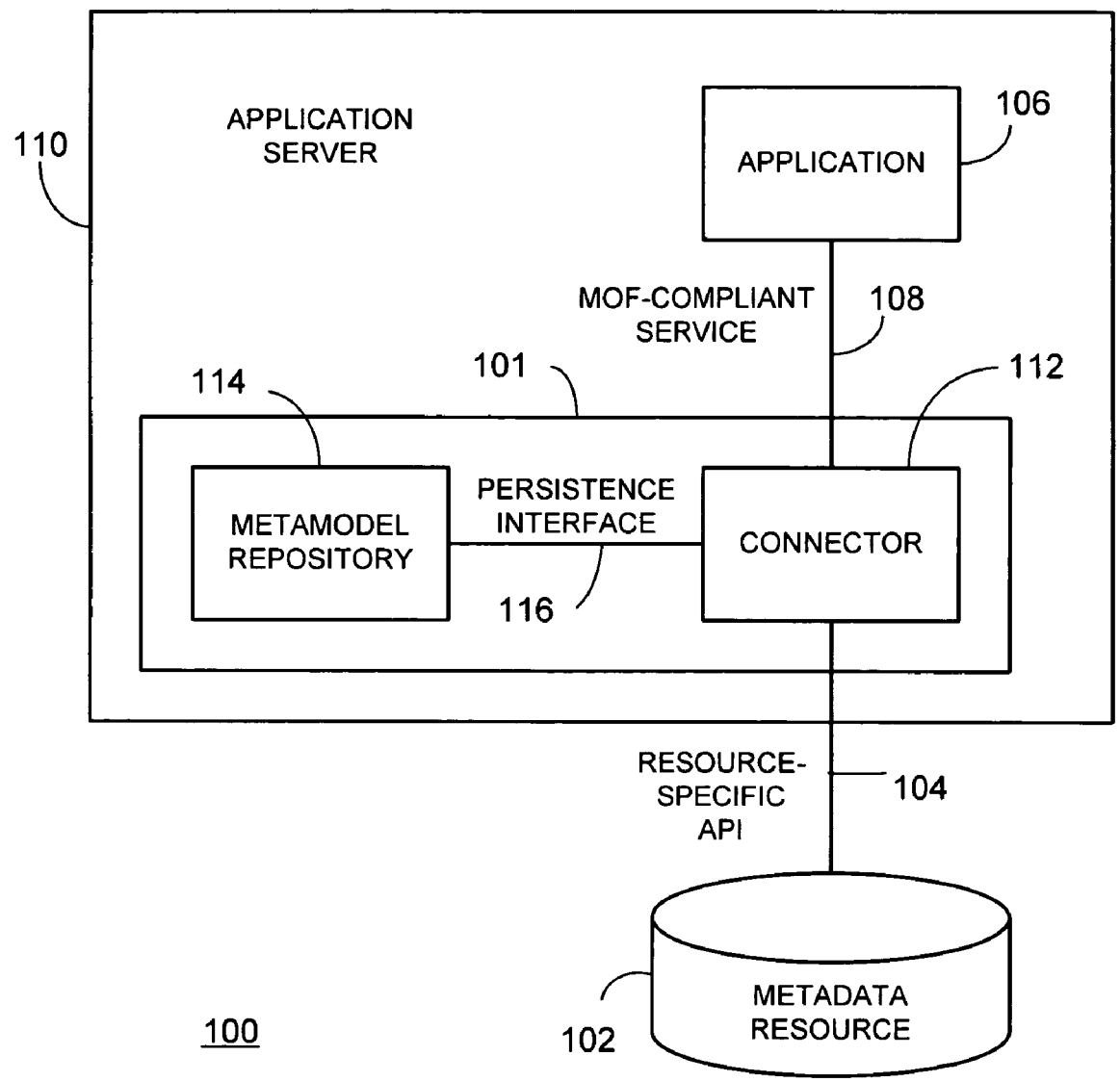
FIG. 1 is block diagram of a system for implementing a MOF-compliant service.

FIG. 1 shows an architecture 100 having a system 101 for enabling a metadata resource in accordance with the MOF. The system 101 can be provided in an application server 110, such as a Java 2 Enterprise Edition (J2EE) server, and the MOF-compliant service can be a JMI service, i.e. JMI-enabling of a metadata resource. However the architecture 100 can also apply to other languages and/or interface services. The architecture includes an application server 110 communicating with a metadata resource 102. The application server 110 hosts at least one application 106 that uses metadata from the metadata resource 102 for executing the application 106. The metadata resource 102 includes a resource-specific API 104 through which metadata can be requested and retrieved by the application 106.

The metadata of the metadata resource 102 is defined by a metamodel, preferably compliant with the MOF. The system 101 provides a MOF-compliant service 108 for mapping and rendering of the metamodel via the resource-specific API 104 to an API (i.e. Java API) used by the application 106. The system 101 includes a connector 112 for integrating the metadata resource 102 with the application 106, by interfacing to both the MOF-compliant service 108 and the resource-specific API 104. The connector 112 includes code that implements the MOF-compliant service via consumption of the resource-specific API. In one example, the application server 110 is a J2EE application server, and the connector 112 is defined according to the J2EE Connector Architecture (JCA). Other implementations of the connector are possible depending on the software language, format, and/or protocol employed by the application server 110.

The system 101 also includes a metamodel repository (MMR) 114, linked to the connector 112 through a persistence interface 116. The MMR 114 includes a repository server that stores models of the structure of data stored in the metadata resource, and provides instantiation and persistence of those models.

Figure 2:
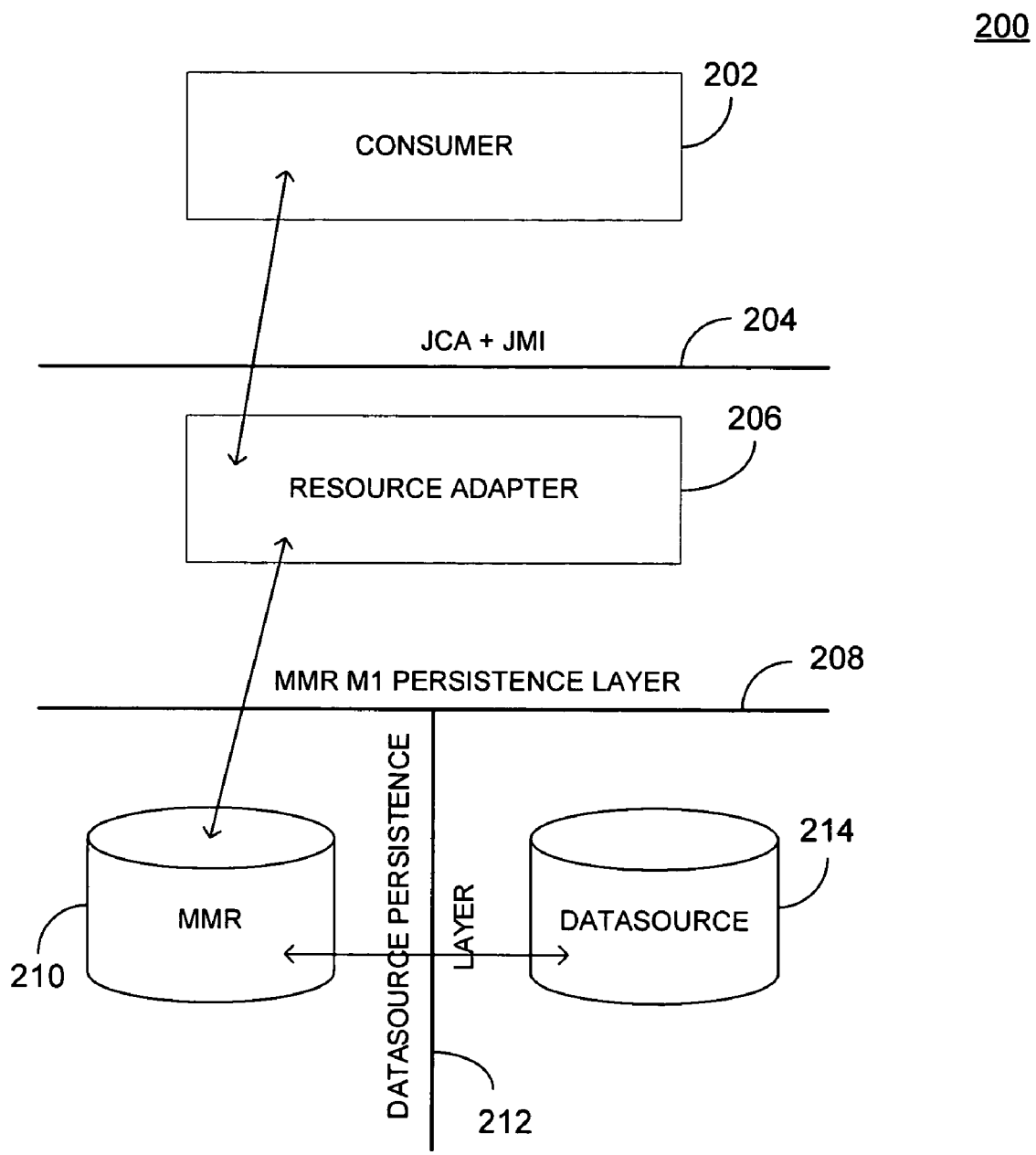
FIG. 2 is a graphical depiction of various data layers in a system for implementing a MOF-compliant service.

FIG. 2 shows a block diagram of the MMR M1 persistence. A datasource 214, i.e. a metadata resource, provides a proprietary metadata API in a datasource-specific format. For example, a JDBC uses java.sql.DatabaseMetaData API. Consumer 202, i.e. applications, need to access metadata in a uniform way, such as via an MOF model rather than a datasource-specific API. An MMR 210 provides instantiation and persistence of the MOF-based models, such as JMI 204 for use with a JCA-type connector. These models are stored in XMI files (i.e. the instances) and some propriatery files (i.e. XML for associations). The instances can also be stored as Java serialized files for redundancy, to improve the read performance. The MMR 210 generates code for both the MOF-compliant interfaces, as well as implementation of the interfaces.

The MMR 210 utilizes a generic metadata layer M1 persistence layer 208 for the MOF-compliant models. The persistence depends on the type of models instantiated. For instance, MOF models do not necessarily have inherent a unique-name concept needed to map MOF instances with their metadata counterparts in the underlying datasource. Use of the M1 persistence layer also simplifies metadata caching with namespaces as associations. This is necessary if the datasource metadata API processing sequence differs considerably from the sequence of metadata access via the model.

The MMR 210 and datasource utilize a datasource persistence layer 212 for communication of the models. Through the datasource persistence layer 212, the datasource 214 fills a simplified metadata cache in the MMR 210, to feed the generic M1 persistence layer 208. This also provides assertion methods, i.e. to ensure requested metadata is available for the generic M1 persistence layer.

Figure 3:
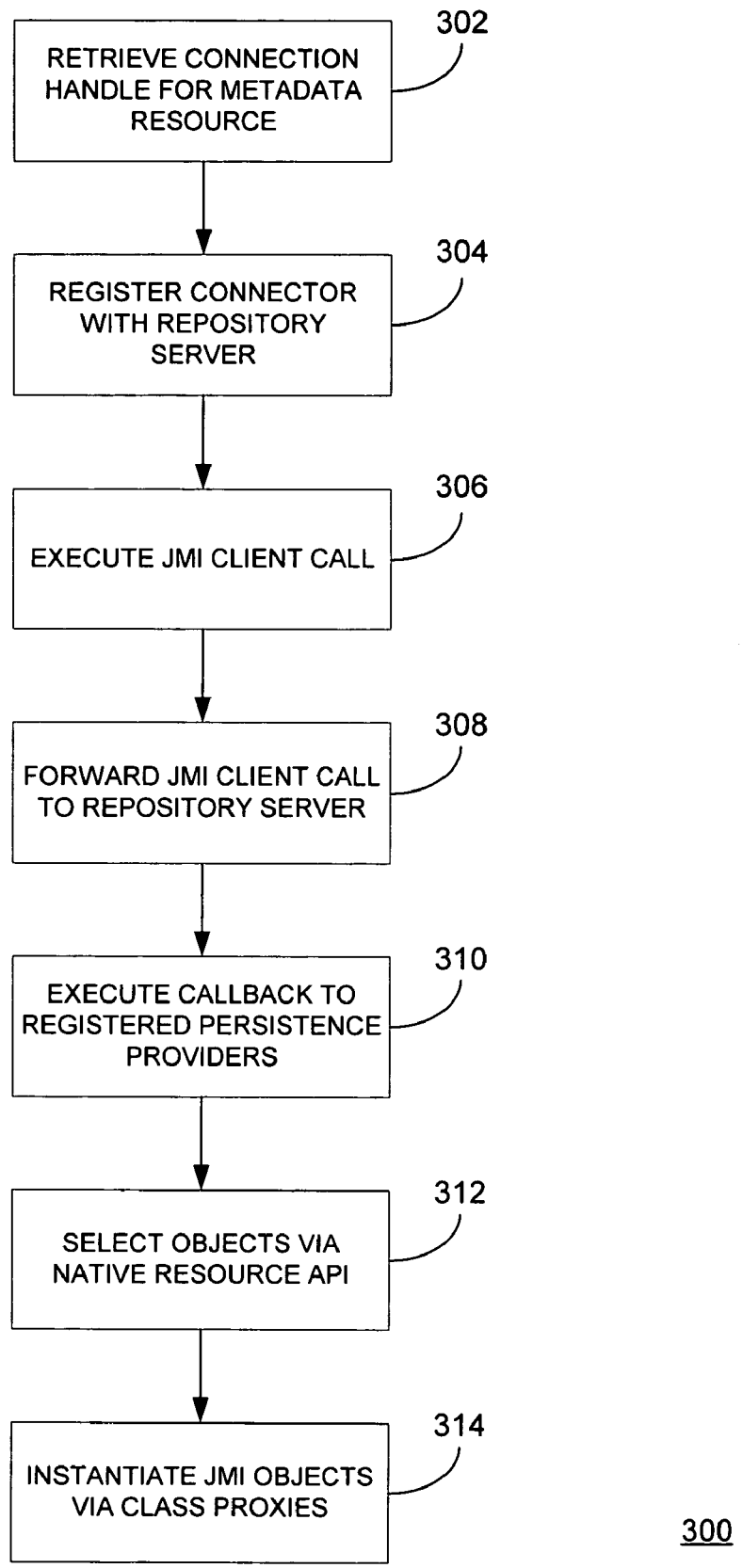
FIG. 3 is a flowchart of a method for implementing a MOF-compliant service.

FIG. 3 is a flowchart of a method for enabling a MOF-compliant service in accordance with one exemplary embodiment. This embodiment will be described in the context of a J2EE application server, and wherein the MOF-compliant service is a JMI service. The client application retrieves a connection handle for the metadata resource at 302. This step can be substantially as described by the JCA. The connection handle provides a custom client interface for the specific domain(s) of the metadata resource. The connection handle serves as an entry point for the JMI service provided by the metadata resource. At 304 the persistence provider (i.e. connector, connection, etc.) registers with the repository server in the MMR. At 306 a JMI client call is executed by the application, e.g. getTable(), and at 308 the persistence provider forwards the call to the repository server.

At 310 the repository server executes a callback to the registered persistence providers. For example, the method selectM1() is called. Then, at 312 the persistence provider selects objects via native resource API. At 314, the persistence provider instantiates the JMI objects via class proxies. Accordingly, this model-driven technique provides on-the-fly mapping of metadata to an application's requirements, and deferred instantiation of metadata associations. Additionally, the techniques described provide a live, as opposed to cached, metadata connection to the underlying metadata resource.

Figure 4:
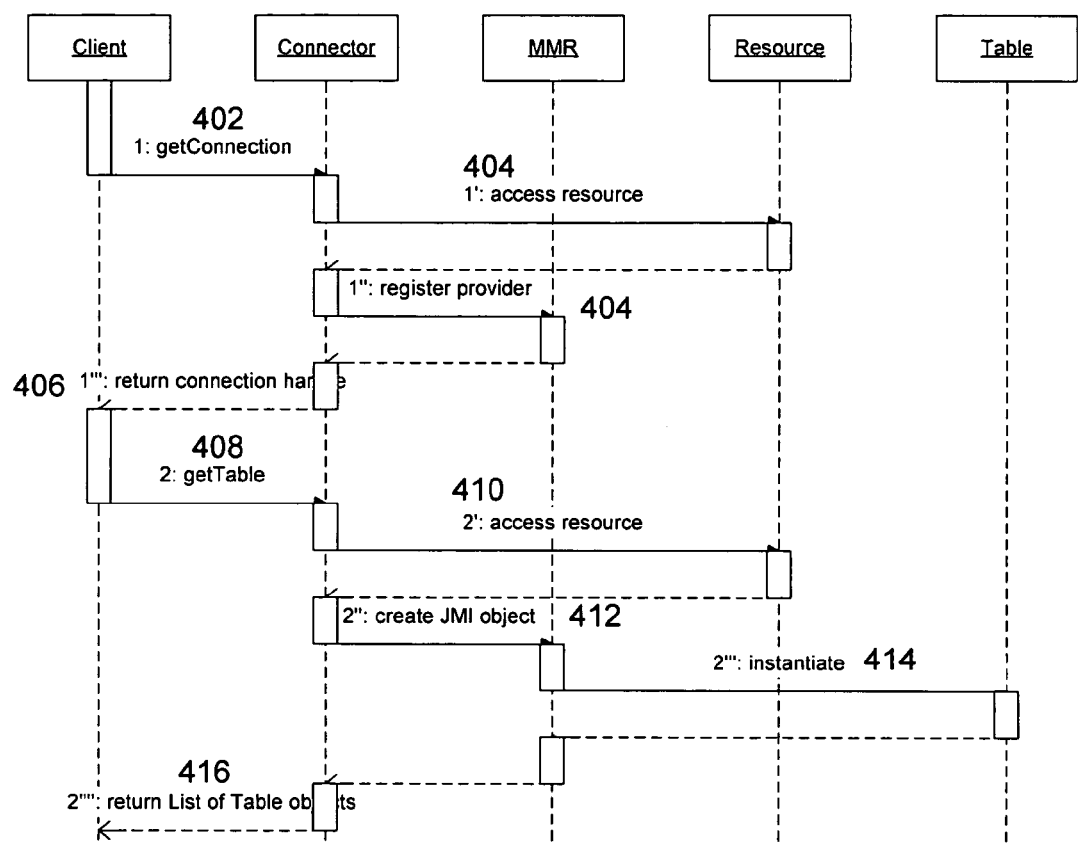
FIG. 4 is a communication sequence for retrieving root-level objects of a MOF-compliant metamodel.

FIG. 4 is a sequence diagram 400 illustrating exemplary interactions for retrieving root- or entry-level objects of an MOF-compliant service model. At 402(1) a client application requests a connection from the associated connector. At 404 (1') the connector establishes a connection with a resource. At 406(1") the connector registers itself as a persistence provider with a repository server. At 408(1''') the connector returns a connection handle to the client application.

At 410(2) the client application requests, via the client API of the connection, a set of root level objects of the model. In this case, the set of root level objects are tables. At 412(2') the connector accessess the resource to retrieve the corresponding metadata through the native API provided by the resource. At 414(2'') the connector uses services provided by the repository server to instantiate with the metadata Table objects. At 416(2''') the repository server instantiates a table object, and at 418(2'''') the connector returns a list of Table objects.

Figure 5:
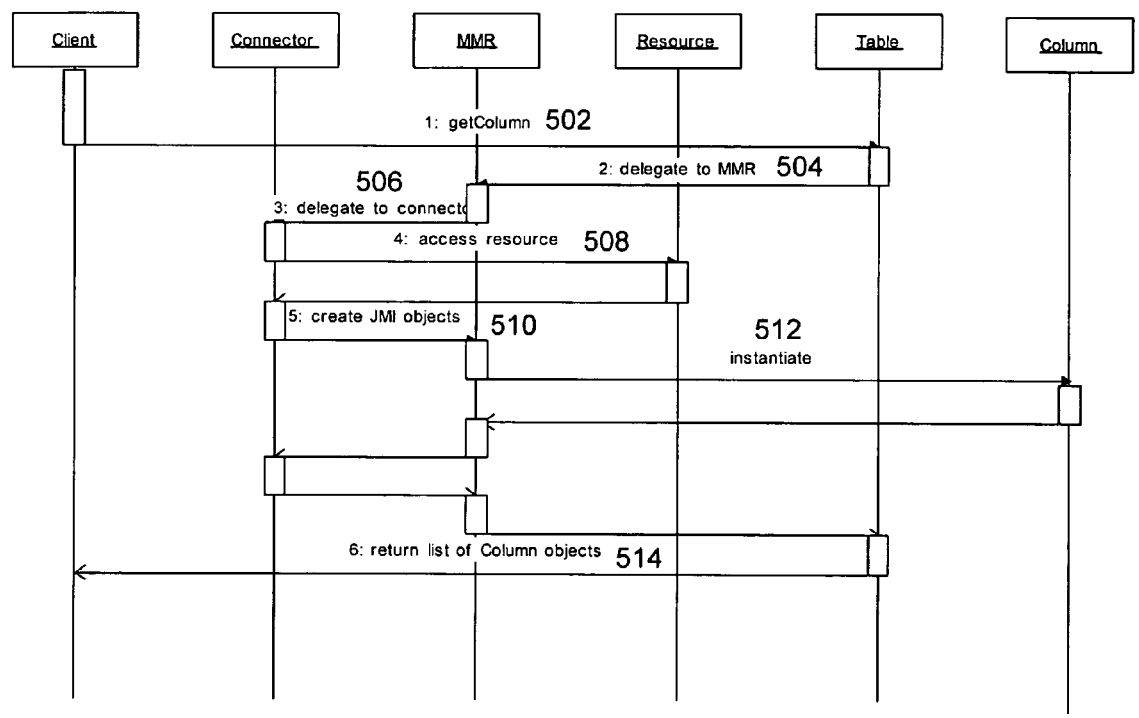
FIG. 5 is a communication sequence for retrieving objects based on associations defined by the metamodel.

FIG. 5 is a sequence diagram 500 illustrating exemplary interactions for retrieving objects based on associations defined by the metamodel. At 502 the client application requests a column object associated with one of the Table objects. The request is executed by the generated JMI service API of the Table object at 504. At 506, in order to fill the associations, the generated implementation of the table object delegates the request to the repository server. At 508, the repository server delegates this request to the registered persistence provider, i.e. via the persistence API.

At 510 the persistence provider ()connector again accesses the resource to retrieve the required metadata. At 512 the connector instantiates Column objects using the MMR services. At 514, the connector returns a List of Column objects to the MMR which in turn returns it to the Table object, that finally passes the list back to the client application.

Although a few embodiments have been described in detail above, other modifications are possible. The logic flows depicted in FIG. 3, or the timing sequences depicted in FIGS. 4 and 5, do not require the particular sequence or timing shown to achieve desirable results. Other embodiments may be within the scope of the following claims.

The invention claimed is:

1. A system for enabling a Meta Object Facility (MOF) compliant service for a metadata resource, comprising:
   a connector configured to receive metadata from the metadata resource via a resource-specific application programming interface corresponding to the metadata resource;
   a metamodel repository storing one or more MOF models defining metadata from the metadata resource accessible via the resource-specific application programming interface; and a persistence interface implemented between the connector and the metamodel repository and configured to instantiate via the resource-specific application programming interface at least one MOF compliant service for the connector based on one of the MOF models in the metamodel repository, the persistence interface implemented as an application programming interface, the persistence interface interfacing persistent components of the system including the metamodel repository, the persistence interface configured to provide instances of the metadata and associations between the metadata according to the instantiated MOF compliant service.

2. A system in accordance with claim 1, wherein the metadata from the metadata resource is read on-demand via the MOF compliant service.

3. A system in accordance with claim 1, wherein the MOF compliant service is a Java Metadata interface (JMI) service.

4. A system in accordance with claim 1, wherein the persistence interface is configured to provide instances of metadata objects and associations between metadata objects according to the MOF compliant service.

5. A system in accordance with claim 1, wherein the metamodel repository includes a repository server configured to generate code for the MOF compliant service.

6. A system in accordance with claim 1, wherein the MOF models are stored in one or more XMI files.

* * * * *